United States Patent [19]

Walach

[11] Patent Number: 5,627,906
[45] Date of Patent: May 6, 1997

[54] IMAGE PROCESSING SYSTEM FOR PRODUCING AN ATTENUATION MAP OF A SCANNED IMAGE

[75] Inventor: Eugene Walach, Kiriat Motzkin, Israel

[73] Assignee: International Business Machines Corporation, Armonk, N.Y.

[21] Appl. No.: 813,230

[22] Filed: Dec. 23, 1991

[30] Foreign Application Priority Data

Dec. 31, 1990 [IL] Israel .................................... 096842

[51] Int. Cl.$^6$ .................................................... G06K 9/34
[52] U.S. Cl. .................... 382/128; 382/173; 128/660.06; 73/599
[58] Field of Search .................... 382/50, 52, 53, 382/6, 36, 38, 128, 131, 224, 173; 73/597, 599, 602, 625; 364/413.25, 413.13; 128/660.06

[56] References Cited

U.S. PATENT DOCUMENTS

| | | | |
|---|---|---|---|
| 4,105,018 | 8/1978 | Greenleaf et al. | 73/597 |
| 4,328,707 | 5/1982 | Clement et al. | 73/618 |
| 4,956,792 | 9/1990 | Sekine | 364/517 |
| 4,993,416 | 2/1991 | Ophir | 73/599 |
| 5,029,226 | 7/1991 | Klein et al. | 382/50 |
| 5,109,436 | 4/1992 | Machida et al. | 382/9 |

OTHER PUBLICATIONS

E. Walach et al., Quantitative Tissue Characterization Based on Pulsed-Echo Ultrasonic Scans, IEEE Transaction on Biomedical Eng., vol. BME-33, No. 7, pp. 637-643, Jul. 1986.

E. Walach et al., Local Tissue Attenuation on Biomedical Engineering, vol. BME-36 No. 2, pp. 211-221, Feb. 2, 1989.

*Primary Examiner*—Michael T. Razavi
*Assistant Examiner*—Jon Chang
*Attorney, Agent, or Firm*—James C. Pintner; Bo-In Lin

[57] ABSTRACT

The present invention comprises an image processing system to process an array of ultrasonic scanning image data. The image processing system is capable of performing local attenuation estimations by the use of the scanned data and displaying the estimated local attenuations in clearly identifiable images whereby the results of the ultrasonic scan can be accurately and easily interpreted. The estimation process comprises the steps of macro segmentation, micro segmentation, classification, and filtering wherein various techniques of average thresholds, classification and homogenization are used to minimize measurement noises and determine the pixels within a homogeneous geometrical element.

27 Claims, 3 Drawing Sheets

IMAGE PROCESSING SYSTEM FOR PRODUCING AN ATTENUATION MAP OF A SCANNED IMAGE

FIELD OF THE INVENTION

The present invention relates generally to an image processing system for generating an attenuation map of a scanned image and more particularly to an ultrasonic scanning and imaging system incorporating said image processing system.

DESCRIPTION OF THE PRIOR ART

Ultrasonic imaging has already had major impact on diagnosis in medicine. Ultrasonic scanning and imaging systems have a particular use in scanning organs of the human body to produce images showing the internal structures of the biological tissues. Such images can be used by skilled medical personnel to perform a diagnosis to determine if the scanned organs have any abnormal features. However, the usefulness of this procedure is limited by the fact that current clinical imaging techniques and computer enhancements produce only qualitative images which require experience for interpretation.

An ultrasonic scanning and imaging system generally comprises an ultrasonic radiation source which irradiates a beam into the object to be imaged. The energy reflected from the object is received and measured by a detector. The measurements of the reflected energy are then further processed for producing an image of the scanned object. Of particular interest to the present invention are ultrasonic imaging systems, generally referred to as B-scans, where both the ultrasonic radiation source, i.e., the transmitter, and the detector are located at the same place.

By irradiating a sequence of short-pulse ultrasonic waves into the object under examination (OUE), ultrasonic radiation is absorbed or reflected by different parts of the object according to the density and other acoustic characteristics. As a result of the reflection, an acoustic echo is created. These echo signals are received at the receiver and stored in the memory as a function of the time of the echo's arrival. Under most circumstances, the speed of transmission of the ultrasonic waves is known, e.g., the speed of sound in a biological tissue is approximately 1500 meters per second. From the time that the echo signal arrives, the distance between the transceiver, i.e., the transmitter and receiver, to the part of the object which actually causes the reflection can be calculated. Hence, by examining the images of echoes received from the object under examination, the internal structure can be constructed. However, the accuracy of construction is limited by several technical difficulties. Although each point of the image provides an amplitude of the echo received from that point inside the body, however, the echo received from that point depends not only on the reflectivity of that point but also on absorption and diffraction of ultrasonic energy along the path from that point to the transceiver. In other words, an image of each point inside the body is distorted by the impact of the tissue along the route of the ultrasonic ray.

In order to mitigate this distortion, a time-gain compensation curve is employed. It is based on the fact that the echo signals which are received at a later time by the detector are signals reflected back from tissues at a further distance away from the transducer. Later received signals have traveled a heater distance and are thus more attenuated. To compensate for this effect, a time-gain compensation (TGC) curve is used to amplify the signals that are received later in time relative to the signals which are received earlier. The purpose of performing a TGC compensation is to remove the distance effect from the scanned image so that a comparison of the true local reflectivity can be performed. However, since the TGC curve is generated based on an operator's own estimates, it is difficult to determine and predict the reliability and accuracy of a diagnosis using the TGC compensated scanned images. Oftentimes, the reliability of the diagnostic results depends mostly on the experience of a physician. Subjective judgment has to be carefully exercised based on personal experience in using a particular type of image scanning system taking into account a particular TGC curve applied so that the probability of erroneous diagnosis may be reduced.

Instead of measuring the local reflectivity, E. Walach et al. proposed a different approach in order to overcome this limitation. Walach et al. disclose that by measuring and displaying the degree of attenuation for each point of the scanned object, the internal structure can be determined. The basic principles and methods of measurements are presented in E. Walach et al., "Quantitative Tissue Characterization Based on Pulsed-Echo ultrasonic Scans", IEEE Transaction on Biomedical Engineering, Vol. BME-33, No. 7, July 1986, pp 637–643; and "Local Tissue Attenuation Images Based on Pulsed-Echo Ultrasonic Scans" IEEE Transactions on Biomedical Engineering, Vol. BME-36, No. Feb. 2, 1989, pp. 211–221. The acoustic feature of a local attenuation at each point of the scanned object is then used to provide a direct quantitative measurement for the determination of the internal structure. For the purposes of medical diagnosis or structure fault detection, an abnormality, discontinuity, or nonuniformity of local attenuations may be used to determine if bad tissues or structure failures exist.

Walach el al. disclose the principles and method for measuring the local attenuation coefficients by use of an ultrasonic scanning system. However, the difficulties still exist that unless direct and accurate images are produced for convenient visual inspection, the usefulness of the scanned data is limited until elaborate analyses are performed to correctly interpret these measurements. Furthermore, even though the analysis results are available, the diagnosis or fault detection may not be performed correctly if the analysis results are not presented in a comprehensive form such that the results can be correctly understood by the persons who perform these tasks.

SUMMARY OF THE PRESENT INVENTION

It is therefore an object of the present invention to provide a scanning image processing system capable of accurately determining the local attenuation.

It is another object of the present invention to generate a visual image of the internal structure of the scanned object using the local attenuation measurements.

It is another object of the present invention to generate and present the visual image representing the internal structure of the scanned object in a comprehensive form whereby the tasks of medical diagnosis or fault detection can be conveniently performed.

It is another object of the present invention to reduce the noise level of an image display caused by measurement errors by applying simple averaging, filtering, and homogenization processes.

Briefly, in a preferred embodiment, the present invention comprises an image processing system which is capable of performing local attenuation estimations by the use of an array of ultrasonic scan image data and displaying the estimated local attenuations in clearly identifiable images whereby the results of the ultrasonic scan can be accurately and easily interpreted. The estimation process comprises the steps of macro segmentation, micro segmentation, classification, and filtering wherein various techniques of average thresholds, classification and homogenization are used to minimize measurement noises and determine the local attenuations for each of the display pixels.

It is an advantage of the present invention that it provides a scanning image processing system capable of accurately determining the local attenuation.

It is another advantage of the present invention that it provides a visual image representing the internal structure of the scanned object which is generated by using the local attenuation measurements.

It is another advantage of the present invention that it generates and presents the visual image representing the internal structures of the scanned object in a comprehensive form whereby the tasks of medical diagnosis or fault detection can be conveniently performed.

It is another advantage of the present invention that the noise level of an image display caused by measurement errors is reduced by applying simple averaging, and filtering, and homogenization processes.

These and other objects and the advantages of the present invention will no doubt become obvious to those of ordinary skill in the art after having read the following detailed description of the preferred embodiment which is illustrated in the various drawing figures.

DETAILED DESCRIPTION OF THE PREFERRED EMBODIMENT

Figure 1:
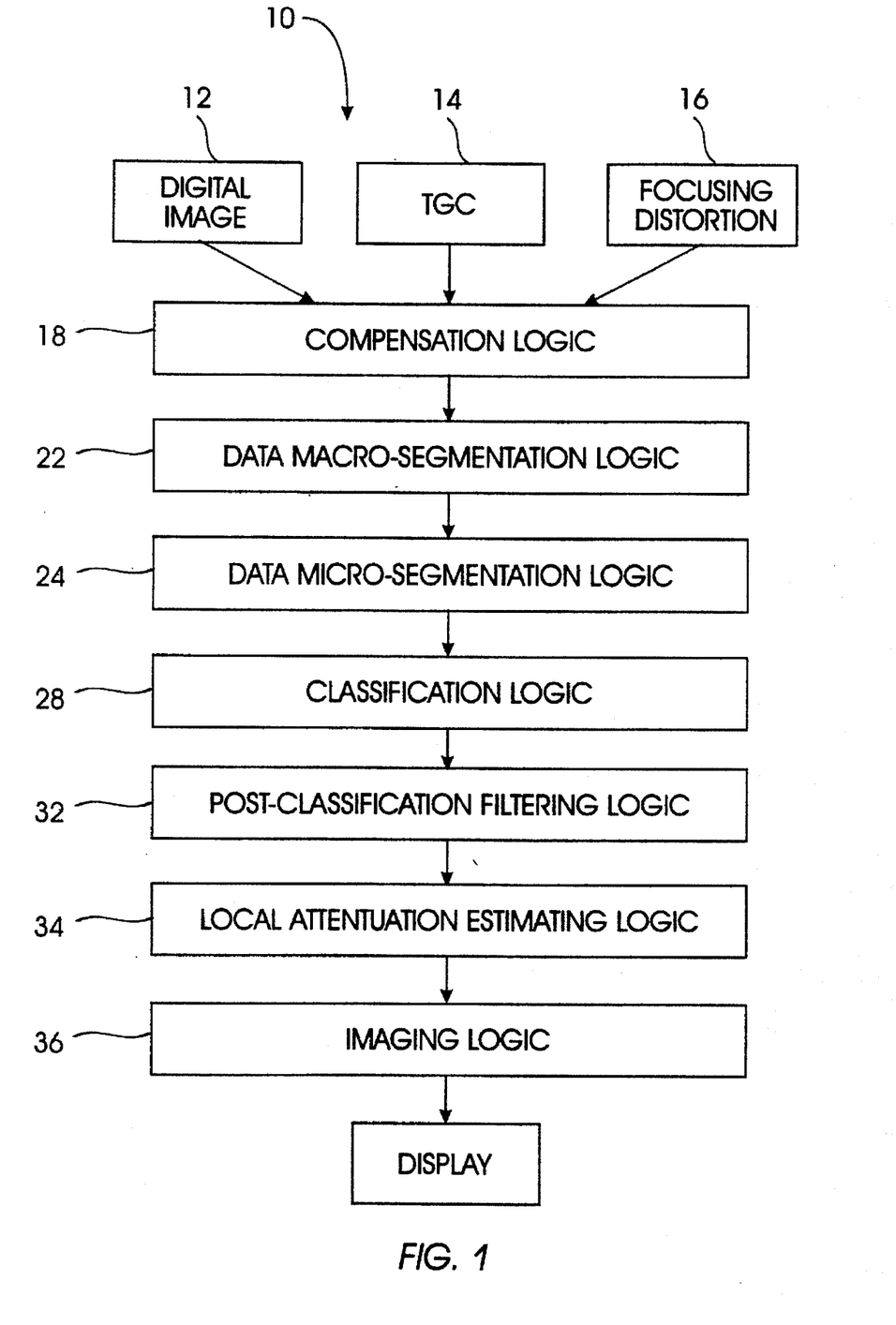
FIG. 1 is a schematic block diagram of the processing logic of an image processing system in accordance with the present invention.

FIG. 1 shows a schematic block diagram of an image processing system 10 which comprises a plurality of logical steps to process the digital image data 12. Digital image data 12 may be received from a variety of input sources such as an ultrasonic scanning apparatus, a data transmission channel or an image data buffer. Image processing system 10 also receives time gain compensation curve (TGC) 14 and data for compensating focus distortion 16. The methods and data for generating, time gain compensation curve 14 and focus distortion data 16 are well known and routinely practiced by those skilled in the art. Compensation logic 18 uses this input data to perform a compensation process. Digital image data 12 received at different times representing image data coming from different depths of a scanned object is compensated by using the time gain compensation curve 14. The focus distortions as calibrated for an optical system used in collecting the digital image data 12, are compensated by using focus distortion input data 16.

Data macro logic 22 receives the compensated image data from compensation logic 18 to compute an initial estimated value of the local attenuation coefficient for every point of the image. A block of data representing the image in the immediate vicinity of a pixel, i.e., a picture element,is first selected. An average attenuation of the entire block is computed and assigned to the pixel which typically is located at the center of the selected block. A transformed image is constructed by data macro logic 22 where a grey level of each pixel is computed to represent the magnitude of the corresponding attenuation coefficient of that pixel. Other than compensations made for TGC and focus distortion, the image data generated by Data Macro Logic 22 forms a single rectangular array generated from the image data. Further data processes are required to take into account the effects of local geometry variations before a local attenuation map can be generated.

Instead of performing a pixel-by-pixel computation for factoring the local effects into the computations of the local attenuation coefficients, the present invention provides a data micro segmentation logic 24. Micro segmentation logic 24 processes and divides the block average attenuation coefficients generated by macro segmentation logic 22 for all the pixels into "micro segments". In a preferred embodiment, micro-segmentation logic 24 divides the image into mutually exclusive blocks, i.e., micro segments, comprising four-by-four (4×4) pixels. Since each micro segment is very small, an assumption is made that there can only be two different tissues present in any given micro segment. In order to optimally partition the micro segment into the individual tissue areas, micro-segmentation logic 24 further performs the following processes:

(a) divides all pixels in each micro segment into groups; pixels having an amplitude above the block average and pixels having an amplitude below the block average;

(b) computes the averages of the "high" and the "low" groups and then computes the average between these two values, i.e., AV; and (c) divides all pixels in each micro-segment into two groups; pixels having an amplitude above AV and pixels having amplitude below AV.

Steps (b) and (c) are repeated in an iterative manner until a predetermined number of iterations is completed. Micro-segmentation logic 24 then assigns to each group of pixels an estimated local attenuation value after the completion of the micro segment partition.

The quality of the scanned image is improved because this image processing system reduces the mutual dependencies of amplitude among the pixels in a micro-segment. Additionally, the noise level caused by random errors of individual pixel measurements is filtered out by the use of this average threshold technique. The computation speed is also improved since the attenuation coefficient is computed for each micro segment instead of for each pixel.

This invention further provides the flexibility of selecting the dimension of the micro segment partition. Depending on the required types of applications, degradations of either actual pixel resolution or subjective image quality can be made unnoticeable by properly partitioning the micro segment. A four-by-four segmentation is expected to be satisfactory for the purpose of applying ultrasonic image process to medical diagnosis in most cases.

In order to reliably estimate the attenuation coefficients, a pixel classification logic 28 is used to classify a large block of pixels within a predefined scanned volume. For example, the pixel classification is performed by classification logic 28 on the data blocks each having 17 pixels in the lateral direction which is about 4 mm long, and 65 pixels in the axial direction which is about 16 mm long. The larger the size of the data block used in classification, the better the quality of the estimation, i.e., the expected estimation error is reduced for a uniform tissue area. However, with increased size in data blocks, the image resolution is decreased. The choice of the size of the data blocks is therefore based on the expected value of the attenuation estimation error balanced by image resolution requirements.

The flexibility of choosing the block size provided in classification logic 28 allows the inclusion of different tissue areas in the same block in medical diagnosis application. Since only a single average attenuation is calculated for the entire block, the inhomogenity in a block may result in some degree of image distortion. In order to prevent this undesirable effect, the pixels in each data block are divided into two groups: pixels within the range appropriate to the tissue under consideration, and pixels which are out of range and should be discarded. The amplitude of each pixel is used to determine whether it is within the range or not. The values close to the amplitude of the point at the center, e.g., +/−6 db, are defined as the domain of echoes likely to be received from the tissue to be imaged.

It should be noted that if the classification is performed on uncompensated pixel amplitudes, even in an entirely homogeneous area, the classification of the data block may be distorted because each pixel may be subject to different attenuations. It is an advantage of the present invention that by using the attenuation-compensated data classification logic 28 provides more accurate classification. Classification logic 28 thus classifies pixels within each macro segment within a predetermined range of average amplitude values of that segment, while the average amplitude is computed based on the first and second average amplitude values for respective micro-segments determined by micro-segmentation logic 24 and compensation logic 18.

In order to generate the initial attenuation compensated data, a rough estimate of local attenuation is first computed. This initial local attenuation can be an array of input data with a set of predetermined values. An iterative computation is then performed. The initial rough estimate of local attenuation is used to compensate the data. The computation is then followed by classification and the results of classification are then used to refine the attenuation coefficients. The refined attenuation coefficients are compared with the initial estimate values. The iterative process is completed until there are no significant changes between the estimated and the refined values. For the purpose of classification, time gain compensation (TGC) 14 as defined by the initial input is used. Accordingly, as depicted in FIG. 1, classification logic 28 receives inputs from micro-segmentation logic 24 and original data from compensation logic 18 where TGC effects have not been removed.

As a result of the process performed by classification logic 28, the macro segment is transformed into a binary map where a value one stands for pixels "in range", and zero for "out-of-range". For convenience of discussion, this map is designated as Map A. A non linear filtering process is then carried out by post classification filtering logic 32 to reduce classification errors.

Post classification filtering logic 32 first eliminates short sequences of the "out-of-range" pixels by assigning a value of one to these pixels. It is based on the assumption that in each block of data where a large number of echo signals are received from a homogeneous volume, there are often pixels which are "out of range" due to measurement errors. By eliminating these short sequences of the out-of-range pixels, the possible impact to the classification process due to the measurement errors is reduced. The resulting map comprises a plurality of lines with sequences of consecutive ones and zeros. This map is designated as Map B. In each line of Map B, the longest sequence of 1 is chosen to designate a plurality of pixels as one homogenous volume and thus creating a new attenuation map designated as Map C. An assumption is made that only the pixels in Map C with consecutive values of one are volumes with homogeneous structure. Using Map C as a filter, post classification filtering 32 performs a Boolean ANDing operation on Map A and Map C to generate a Map D.

Map D represents the amplitudes of the echo signals received from a plurality of homogeneous volumes. By assuming that the echo amplitudes from homogeneous volumes follow a Rayleigh distribution, a local attenuation estimating logic 34 applies the maximum likelihood principle or a Prony method to estimate the local attenuation coefficients. Since all echo signals are reflected back from homogeneous volumes based on the distribution of Map D, the values of echo amplitudes received from consecutive pixels represent relative effects of ultrasonic attenuation. These arrays of amplitudes representing local attenuation coefficients can be normalized to a predetermined value for the convenience of image processing and display.

A data array representing the mapping of local attenuations is thus created from a plurality of signals which are originally received and measured in the domain of echo amplitudes. An imaging logic 36 then generates an image for display by transforming this array of attenuation coefficients into the final image space showing relative attenuation coefficients at each of their geometrical locations.

The imaging logic 36 generates an image for display by first assigning to each predefined range of relative attenuations a display grey level. Generally, brighter colors are used to represent high attenuation and darker colors are for low attenuation. However, for the purpose of diagnosis, it is often necessary to adopt a grey level system which would be specifically designed to display a special tissue structure of interest. This invention utilizes a nonlinear look up table to shift a predefined "normal" value to the center of the display range. For example, in examining a liver on a monitor having 256 grey levels, the value corresponding to the normal liver attenuation, which is about 0.5 db/cm Mhz, will be assigned to a grey level of approximately 128.

By using a color display system, various features showing different homogeneous tissue structures may be displayed simultaneously which, in combination, may have the advantage of providing more important information in the process of performing a diagnostic analysis. In order to achieve this goal, each distinct homogeneous array of pixels is displayed in different color whereby a diagnosis based on the total picture of the entire scanned area can be performed. A different color display method can be utilized where a look-up table is used to display all the healthy and normal tissue in grey or dark color, while red or an other brighter color is used for abnormal structures where the local attenuation coefficients deviate from their normal homogeneous values.

Figure 2:
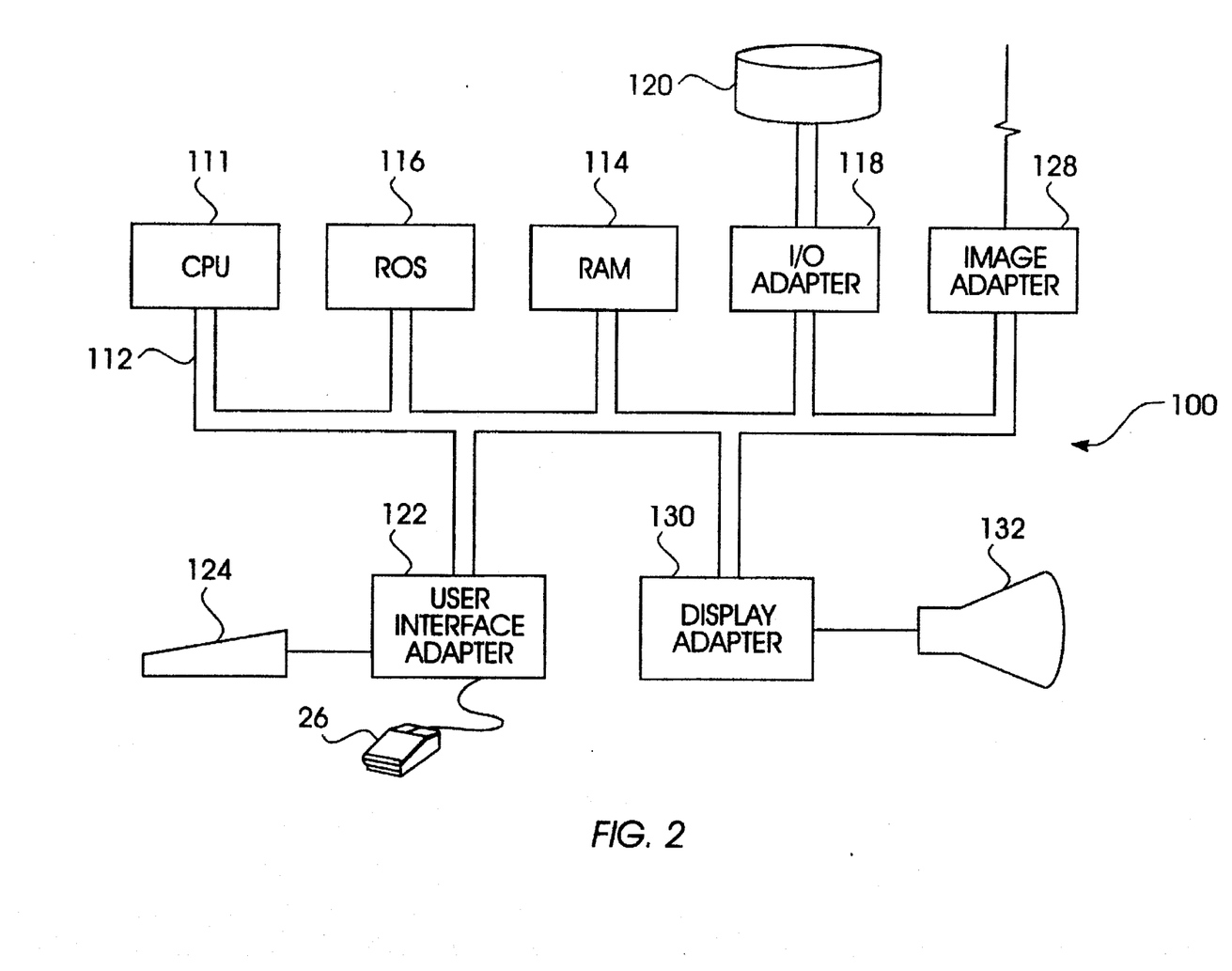
FIG. 2 is a schematic block diagram of a computer executable program showing one of the preferred embodiments of an image processing system of the present invention.

FIG. 2 is a schematic block diagram of an image processor 100 in the form of a personal computer comprising a number of different system units connected via a system bus 112. Connected to system bus 112 is a microprocessor 111, random access memory 114, read only memory 116, a user interface adapter 122, a display adapter 130, an I/O adapter 118, and an image adapter 128. The user interface adapter 122 is used to connect a keyboard 124 and/or other input devices, such as mouse 126, to the system bus 112. The display adapter 130 connects the system bus 112 to a display device 132. The I/O adapter likewise provides a connection between other I/O devices 120, such as DASDs and system bus 112. The image adapter enables a source of image data such as an ultrasonic scanner (not shown) to be connected to the personal computer. Other connections such as a communication adapter (not shown) could be added for allowing a personal computer to communicate with an external processor or processors including a mainframe host computer (not shown).

In this embodiment, the scanning data process logic described above is implemented in a hardware and software system illustrated in FIG. 1 and 2. However, it is well known by those skilled in the art that the data processing steps can be implemented in various special purpose software and hardware systems without deviating from the scope of the present invention.

Figure 3:
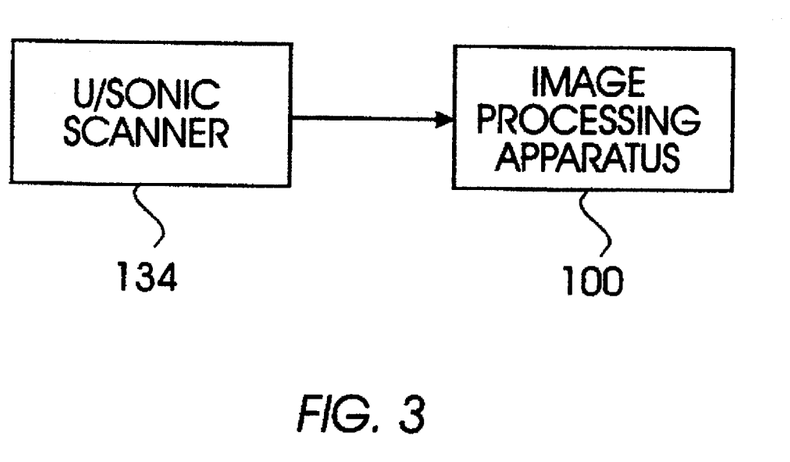
FIG. 3 is another preferred embodiment of an ultrasonic scanning and image processing system of the present invention.

FIG. 3 is a schematic block diagram illustrating an ultrasonic scanning system comprising an ultrasonic scanner 134 and the image processor 100.

Although the present invention has been described in terms of the presently preferred embodiment, it is to be understood that such disclosure is not to be interpreted as limiting. Various alterations and modifications will no doubt become apparent to those skilled in the art after reading the above disclosure. Accordingly, it is intended that the appended claims be interpreted as covering all alterations and modifications as fall within the true spirit and scope of the invention.

I claim:

1. An image processing method for processing an image of a subject, the image having regions based on the subject, the image including an array of image data elements, to generate an attenuation map therefrom, the method comprising the steps of:

for each respective one of the image data elements, macro-segmenting the image into a block, the block including the respective image data element and a plurality of image data elements near the respective image data element;

for each block produced by the step of macro-segmenting, computing a respective average attenuation based on the image data elements included within the block, and assigning the computed average attenuation to the respective one of the image data elements, thereby creating a transformed image made up of image data elements whose values are the computed average attenuations;

micro-segmenting the image data elements of the transformed image into blocks which are mutually exclusive and which are sufficiently small that a given block includes image data elements of at most two of the regions of the subject;

for each block produced by the step of micro-segmenting, computing a block average value based on the average attenuations computed for each image data element therewithin by the step of computing respective average attenuations for each block produced by the step of macro-segmenting;

for each block produced by the step of micro-segmenting, dividing the data elements into groups, the groups including (i) a group of image data elements whose values are greater than the block average computed by the step of computing a block average for each block produced by the step of micro-segmenting, and (ii) a group of image data elements whose values are less than the block average computed by the step of computing a block average for each block produced by the step of micro-segmenting;

for each block produced by the step of micro-segmenting, computing respective average values for the image data elements of each respective one of the groups therewithin produced by the step of dividing, and computing an overall average value between the respective average values; and using the overall average value as the block average, repeating, iteratively, the step of dividing the data elements of each micro-segment into groups and the step of computing respective average values and an overall average value, a predetermined number of times.

2. A method as recited in claim 1, wherein:

the method further includes the step of selecting a dimension of the blocks to be produced by the step of micro-segmenting; and the step of micro-segmenting includes dividing the image data elements of the transformed image into micro-segments having the selected dimension.

3. A method as recited in claim 2, wherein the step of selecting a dimension includes selecting a dimension of 4×4 local attenuation coefficients for the blocks to be produced by the step of micro-segmenting.

4. A method as recited in claim 1, wherein:

the step of macro-segmenting includes macro-segmenting the image into blocks, each block having a center image data element and a plurality of other image data elements surrounding the center image data element; and in the step of assigning the computed average attenuation to the respective one of the image data elements, the respective one of the image data elements is the center image data element.

5. A method as recited in claim 1, further comprising the step of:

producing, for each image data element, a respective estimated local attenuation value; and producing, for each image data element, a respective pixel having a value relented to the magnitude of the local attenuation coefficient for the image data element.

6. A method as recited in claim 5, wherein:

there is a desired range of values for the pixels generated by the step of producing respective pixels; and the method further comprises the steps of:

identifying pixels whose values fall outside the desired range; and assigning an in-range value to the pixels identified by the step of identifying.

7. A method as recited in claim 6, wherein the step of identifying pixels whose values fall outside the desired range includes producing a first bit map including bits respectively corresponding with the image data elements, each bit having a first value if the local attenuation coefficient of the corresponding image data element falls within the desired range of values, and having a second value otherwise.

8. A method as recited in claim 7, wherein:

there is a predetermined length threshold for bit sequences of the first bit map; and the method further comprises the steps of:

identifying a sequence of bits of the first bit map, the bits corresponding with pixels whose values fall outside the desired range, the sequence having a length less than the predetermined length threshold; and eliminating the identified sequence of out-of-range pixels by assigning an in-range value to the pixels identified by the step of identifying, thereby producing a second bit map.

9. A method as recited in claim 8, further comprising the steps of:

designating a longest sequence of contiguous values of the second bit map as corresponding with a homogeneous structure, thereby creating a third bit map; and performing a logical operation between the first bit map and the third bit map, thereby producing a fourth bit map which represents amplitudes of signals received from a plurality of homogeneous volumes.

10. An image processing system for processing an image of a subject, the image having regions based on the subject, the image including an array of image data elements, to generate an attenuation map therefrom, the system comprising:

means, operable for each respective one of the image data elements, for macro-segmenting the image into a block, the block including the respective image data element and a plurality of image data elements near the respective image data element;

means, operable for each block produced by the means for macro-segmenting, for computing a respective average attenuation based on the image data elements included within the block, and for assigning the computed average attenuation to the respective one of the image data elements, thereby creating a transformed image made up of image data elements whose values are the computed average attenuations;

means for micro-segmenting the image data elements of the transformed image into blocks which are mutually exclusive and which are sufficiently small that a given block includes image data elements of at most two of the regions of the subject;

means, operable for each block produced by the means for micro-segmenting, for computing a block average value based on the average attenuations computed for each image data element therewithin by the means for computing respective average attenuations for each block produced by the means for macro-segmenting;

means, operable for each block produced by the means for micro-segmenting, for dividing the data elements into groups, the groups including (i) a group of image data elements whose values are greater than the block average computed by the means for computing a block average for each block produced by the means for micro-segmenting, and (ii) a group of image data elements whose values are less than the block average computed by the means for computing a block average for each block produced by the means for micro-segmenting;

means, operable for each block produced by the means for micro-segmenting, for computing respective average values for the image data elements of each respective one of the groups therewithin produced by the means for dividing, and computing an overall average value between the respective average values; and means, operable using the overall average value as the block average, for repeating, iteratively, operation of the means for dividing the data elements of each micro-segment into groups and the means for computing respective average values and an overall average value, a predetermined number of times.

11. A system as recited in claim 10, wherein:

the system further includes means for selecting a dimension of the blocks to be produced by the means for micro-segmenting; and the means for micro-segmenting includes means for dividing the image data elements of the transformed image into micro-segments having the selected dimension.

12. A system as recited in claim 11, wherein the means for selecting a dimension includes means for selecting a dimension of 4×4 local attenuation coefficients for the blocks to be produced by the means for micro-segmenting.

13. A system as recited in claim 10, wherein:

the means for macro-segmenting includes means for macro-segmenting the image into blocks, each block having a center image data element and a plurality of other image data elements surrounding the center image data element; and for the operation of the means for assigning the computed average attenuation to the respective one of the image data elements, the respective one of the image data elements is the center image data element.

14. A system as recited in claim 10, further comprising:

means for producing, for each image data element, a respective estimated local attenuation value; and means for producing, for each image data element, a respective pixel having a value related to the magnitude of the local attenuation coefficient for the image data element.

15. A system as recited in claim 14, wherein:

there is a desired range of values for the pixels generated by the means for producing respective pixels; and the system further comprises:

means for identifying pixels whose values fall outside the desired range; and means for assigning an in-range value to the pixels identified by the means for identifying.

16. A system as recited in claim 15, wherein the means for identifying pixels whose values fall outside the desired range includes means for producing a first bit map including bits respectively corresponding with the image data elements, each bit having a first value if the local attenuation coefficient of the corresponding image data element falls within the desired range of values, and having a second value otherwise.

17. A system as recited in claim 16, wherein:

there is a predetermined length threshold for bit sequences of the first bit map; and the system further comprises:

means for identifying a sequence of bits of the first bit map, the bits corresponding with pixels whose values fall outside the desired range, the sequence having a length less than the predetermined length threshold; and means for eliminating the identified sequence of out-of-range pixels by assigning an in-range value to the pixels identified by the means for identifying, thereby producing a second bit map.

18. A system as recited in claim 17, further comprising:

means for designating a longest sequence of contiguous values of the second bit map as corresponding with a homogeneous structure, thereby creating a third bit map; and means for performing a logical operation between the first bit map and the third bit map, thereby producing a fourth bit map which represents amplitudes of signals received from a plurality of homogeneous volumes.

19. A computer program product, for use with an image processing and computing system, for processing an image of a subject, the image having regions based on the subject, the image including an array of image data elements, to generate an attenuation map therefrom, the computer program product comprising:

a computer-readable medium;

means, recorded on the computer-readable medium, operable for each respective one of the image data elements, for directing the image processing and computing system to macro-segment the image into a block, the block including the respective image data element and a plurality of image data elements near the respective image data element;

means, recorded on the computer-readable medium, operable for each block produced by the means for directing to macro-segment, for directing the image processing and computing system to compute a respective average attenuation based on the image delta elements included within the block, and to assign the computed average attenuation to the respective one of the image data elements, thereby creating a transformed image made up of image data elements whose values are the computed average attenuations;

means, recorded on the recording medium, for directing the image processing and computing system to micro-segment the image data elements of the transformed image into blocks which are mutually exclusive and which are sufficiently small that a given block includes image data elements of at most two of the regions of the subject;

means, recorded on the computer-readable medium, operable for each block produced by the means for directing to micro-segment, for directing the image processing and computing system to compute a block average value based on the average attenuations computed for each image data element therewithin by the means for directing to compute respective average attenuations for each block produced by the means for directing to macro-segment;

means, recorded on the computer-readable medium, operable for each block produced by the means for directing to micro-segment, for directing the image processing and computing system to divide the data elements into groups, the groups including (i) a group of image data elements whose values are greater than the block average computed by the means for directing to compute a block average for each block produced by the means for directing to micro-segment, and (ii) a group of image data elements whose values are less than the block average computed by the means for directing to compute a block average for each block produced by the means for directing to micro-segment;

means, recorded on the computer-readable medium, operable for each block produced by the means for directing to micro-segment, for directing the image processing and computing system to compute respective average values for the image data elements of each respective one of the groups therewithin produced by the means for directing to divide, and for directing the image processing and computing system to compute an overall average value between the respective average values; and means, recorded on the computer-readable medium, operable using the overall average value as the block average, for directing the image processing and computing system to repeat, iteratively, operation of the means for directing to divide the data elements of each micro-segment into groups and the means for directing to compute respective average values and an overall average value, a predetermined number of times.

20. A computer program product as recited in claim 19, wherein:

the computer program product further includes means, recorded on the recording medium, for directing the image processing and computing system to select a dimension of the blocks to be produced by the means for directing to microsegment; and the means for directing to micro-segment includes means, recorded on the recording medium, for directing the image processing and computing system to divide the image data elements of the transformed image into micro-segments having the selected dimension.

21. A computer program product as recited in claim 20, wherein the means for directing to select a dimension includes means, recorded on the recording medium, for directing the image processing and computing system to select a dimension of 4×4 local attenuation coefficients for the blocks to be produced by the means for directing to micro-segment.

22. A computer program product as recited in claim 19, wherein:

the means for directing to macro-segment includes means, recorded on the recording medium, for directing the image processing and computing system to macro-segment the image into blocks, each block having a center image data element and a plurality of other image data elements surrounding the center image data element; and for the operation of the means for directing to assign the computed average attenuation to the respective one of the image data elements, the respective one of the image data elements is the center image data element.

23. A computer program product as recited in claim 19, further comprising:

means, recorded on the recording medium, for directing the image processing and computing system to produce, for each image data element, a respective estimated local attenuation value; and means, recorded on the recording medium, for directing the image processing and computing system to produce, for each image data element, a respective pixel having a value related to the magnitude of the local attenuation coefficient for the image data element.

24. A computer program product m as recited in claim 23, wherein:

there is a desired range of values for the pixels generated by the means for directing to produce respective pixels; and the computer program product further comprises:

means, recorded on the recording medium, for directing the image processing and computing system to identify pixels whose values fall outside the desired range; and means, recorded on the recording medium, for directing the image processing and computing system to assign an in-range value to the pixels identified by the means for directing to identify.

25. A computer program product as recited in claim 24, wherein the means for directing to identify pixels whose values fall outside the desired range includes means, recorded on the recording medium, for directing the image processing and computing system to produce a first bit map including bits respectively corresponding with the image data elements, each bit having a first value if the local attenuation coefficient of the corresponding image data element falls within the desired range of values, and having a second value otherwise.

26. A computer program product as recited in claim 25, wherein:

there is a predetermined length threshold for bit sequences of the first bit map; and the computer program product further comprises:

means, recorded on the recording medium, for directing the image processing and computing system to identify a sequence of bits of the first bit map, the bits corresponding with pixels whose values fall outside the desired range, the sequence having a length less than the predetermined length threshold; and means, recorded on the recording medium, for directing the image processing and computing system to eliminate the identified sequence of out-of-range pixels by assigning an in-range value to the pixels identified by the means for directing to identify, thereby producing a second bit map.

27. A computer program product m as recited in claim 26, further comprising:

means, recorded on the recording medium, for directing the image processing and computing system to designate a longest sequence of contiguous values of the second bit map as corresponding with a homogeneous structure, thereby creating a third bit map; and means, recorded on the recording medium, for directing the image processing and computing system to perform a logical operation between the first bit map and the third bit map, thereby producing a fourth bit map which represents amplitudes of signals received from a plurality of homogeneous volumes.

* * * * *